April 28, 1964  J. H. APEL ETAL  3,130,654
MATERIAL DISTRIBUTING AND LEVELING MACHINE
Filed Aug. 31, 1961  12 Sheets-Sheet 6
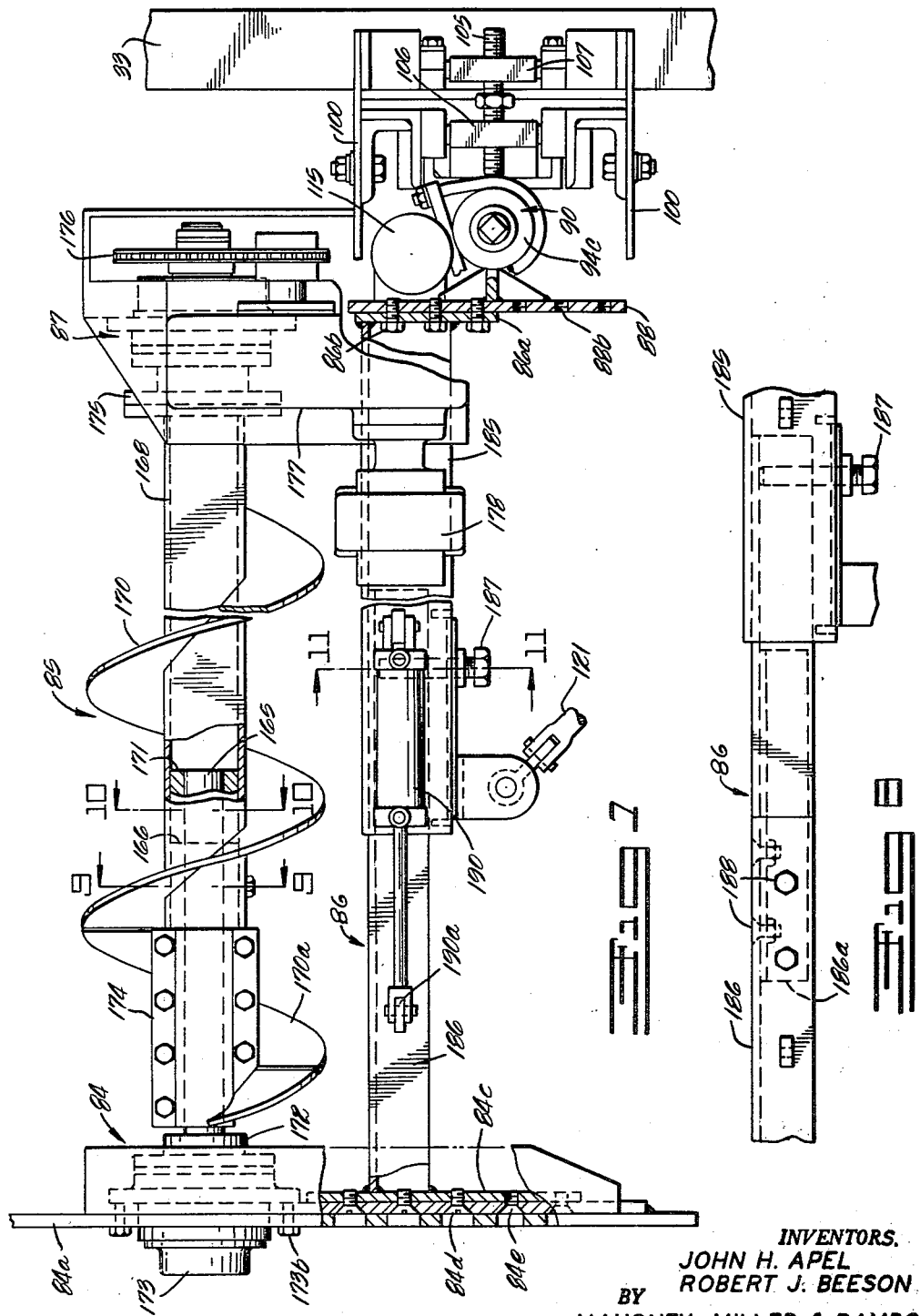
INVENTORS.
JOHN H. APEL
ROBERT J. BEESON
BY MAHONEY, MILLER & RAMBO
BY *Wm. V. Miller*
ATTORNEYS.

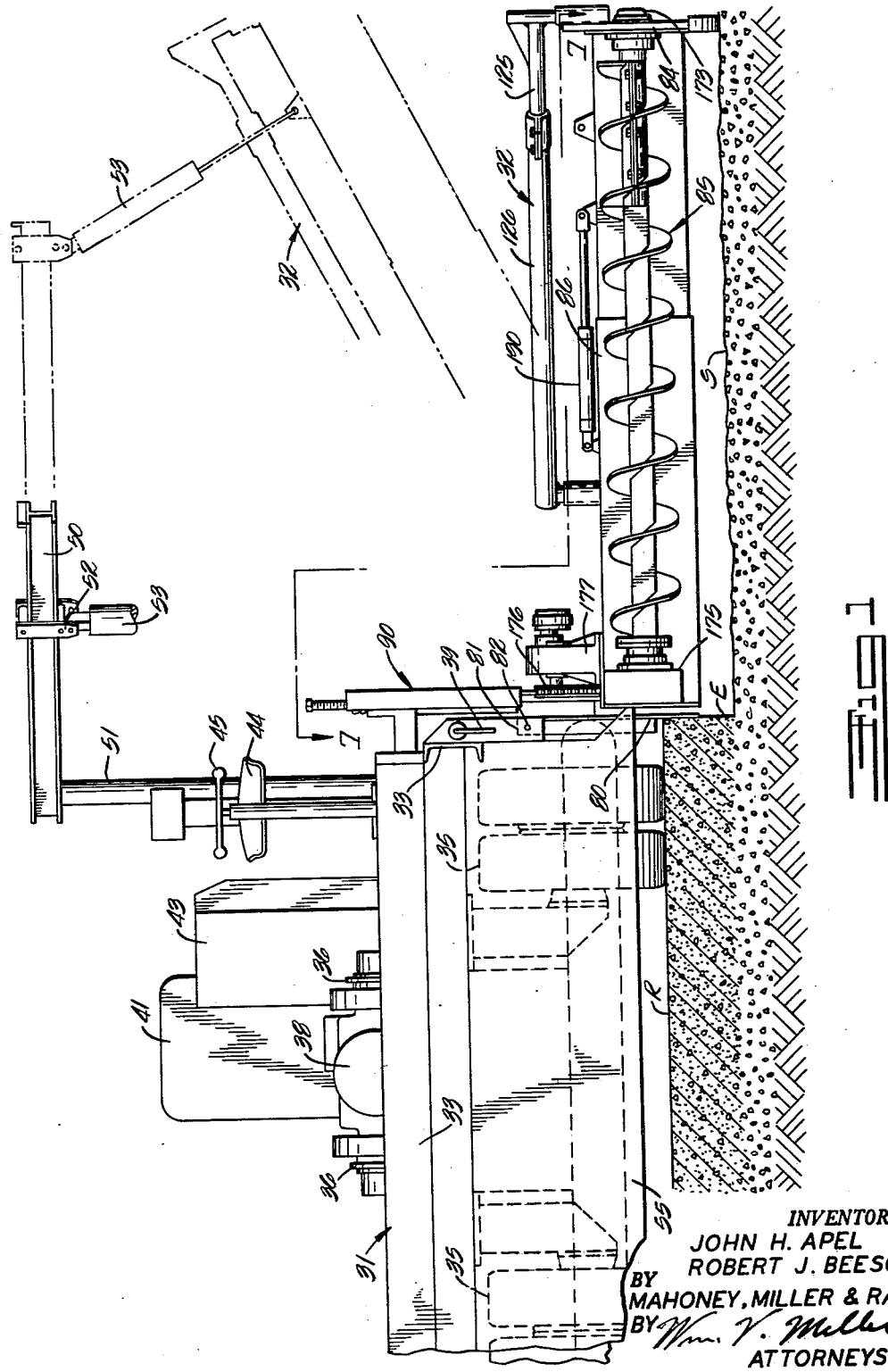

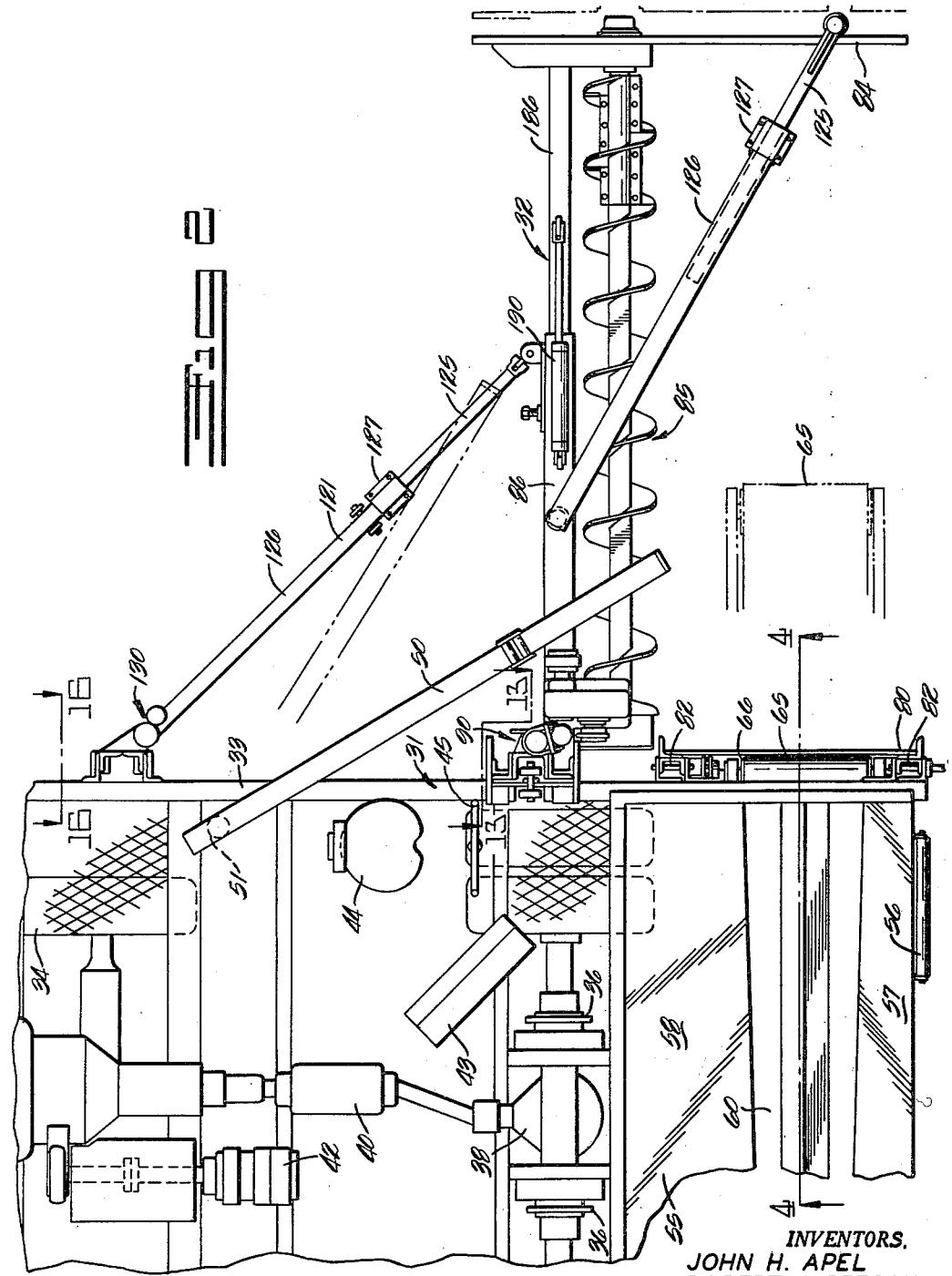

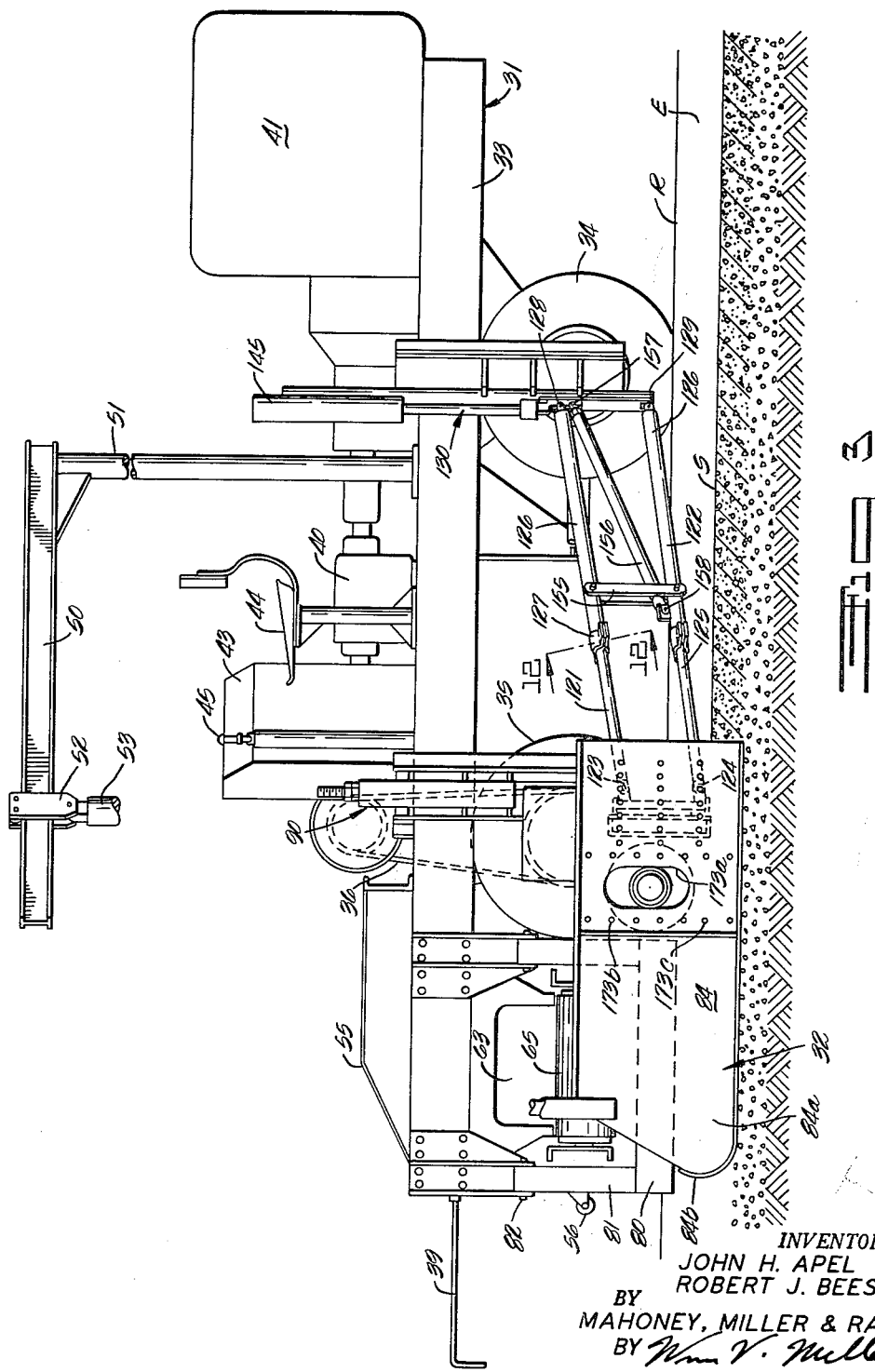

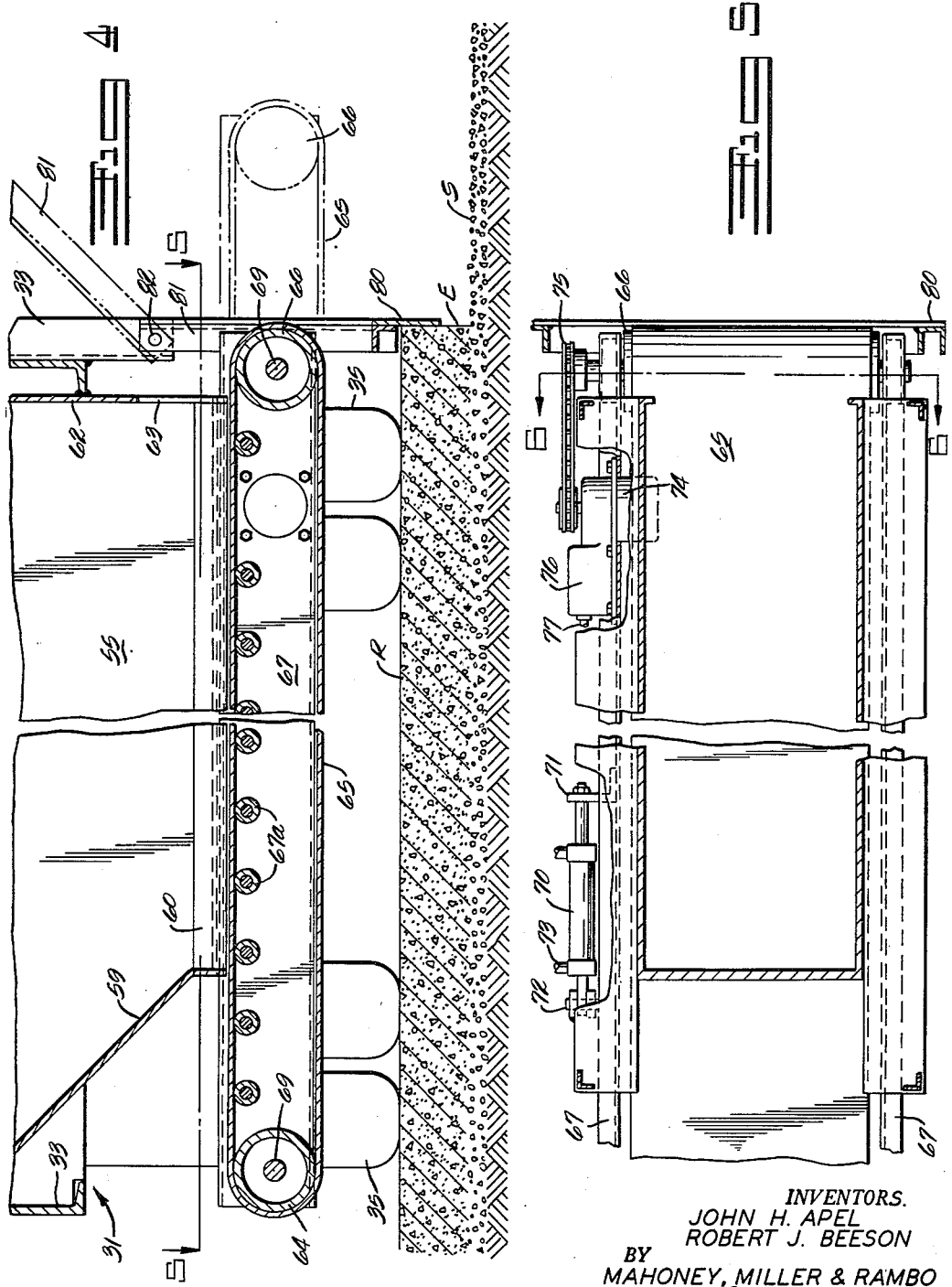

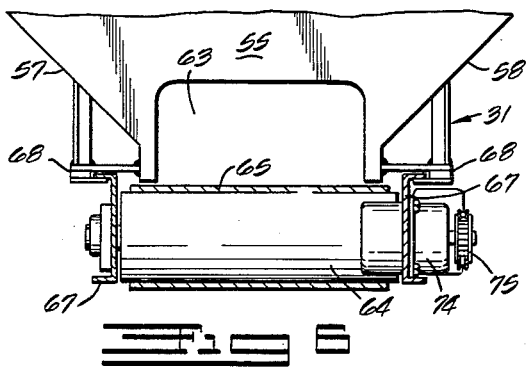
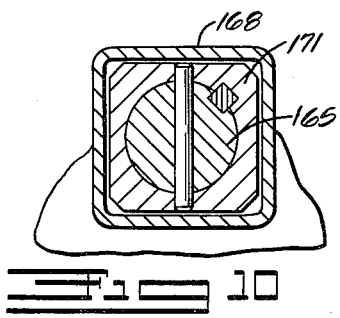
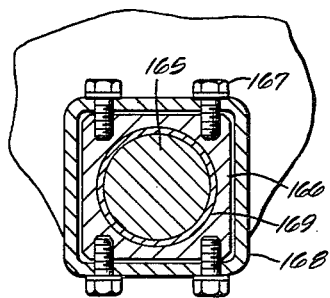
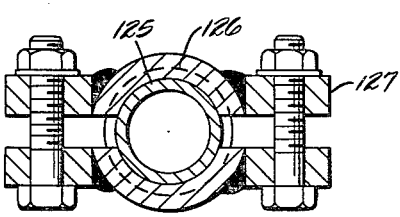
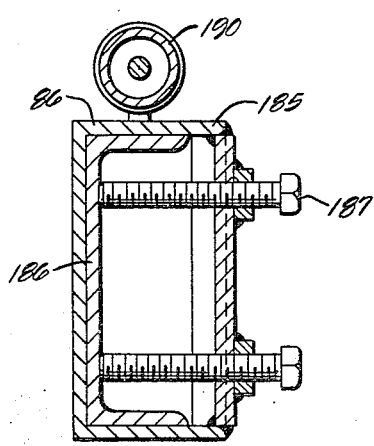
INVENTORS,
JOHN H. APEL
ROBERT J. BEESON
BY MAHONEY, MILLER & RAMBO
BY
ATTORNEYS.

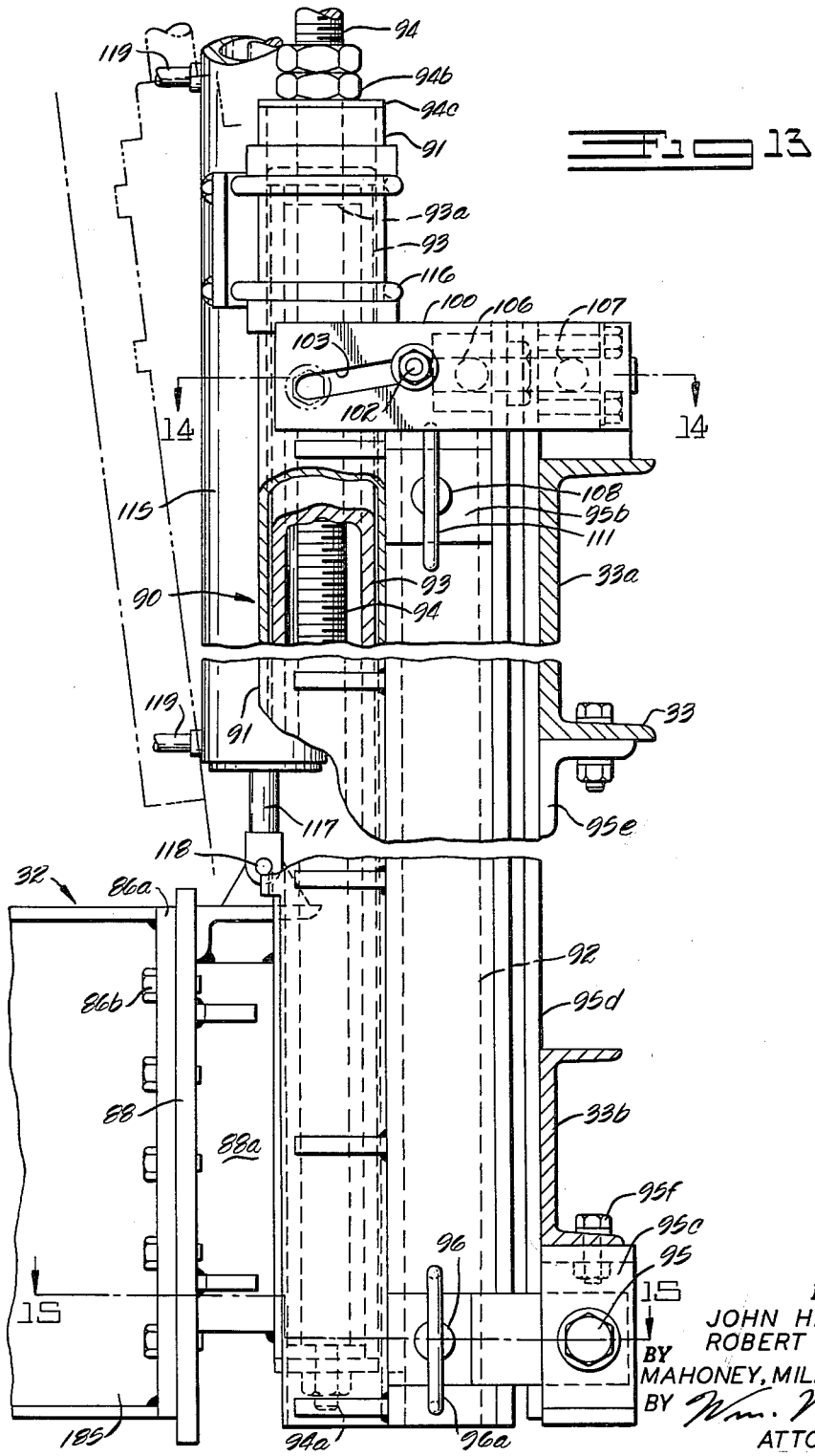

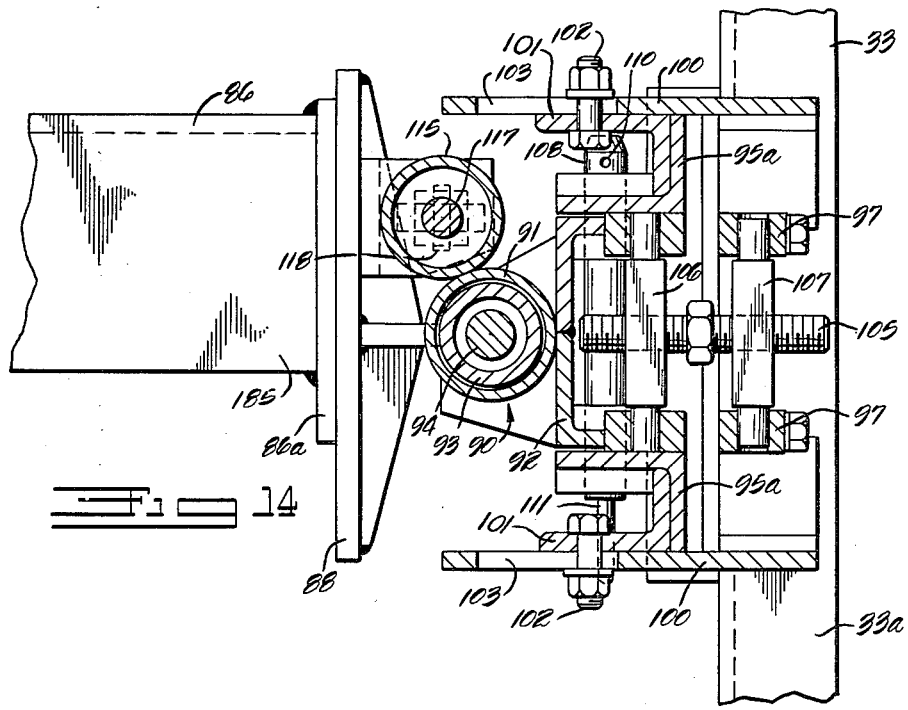

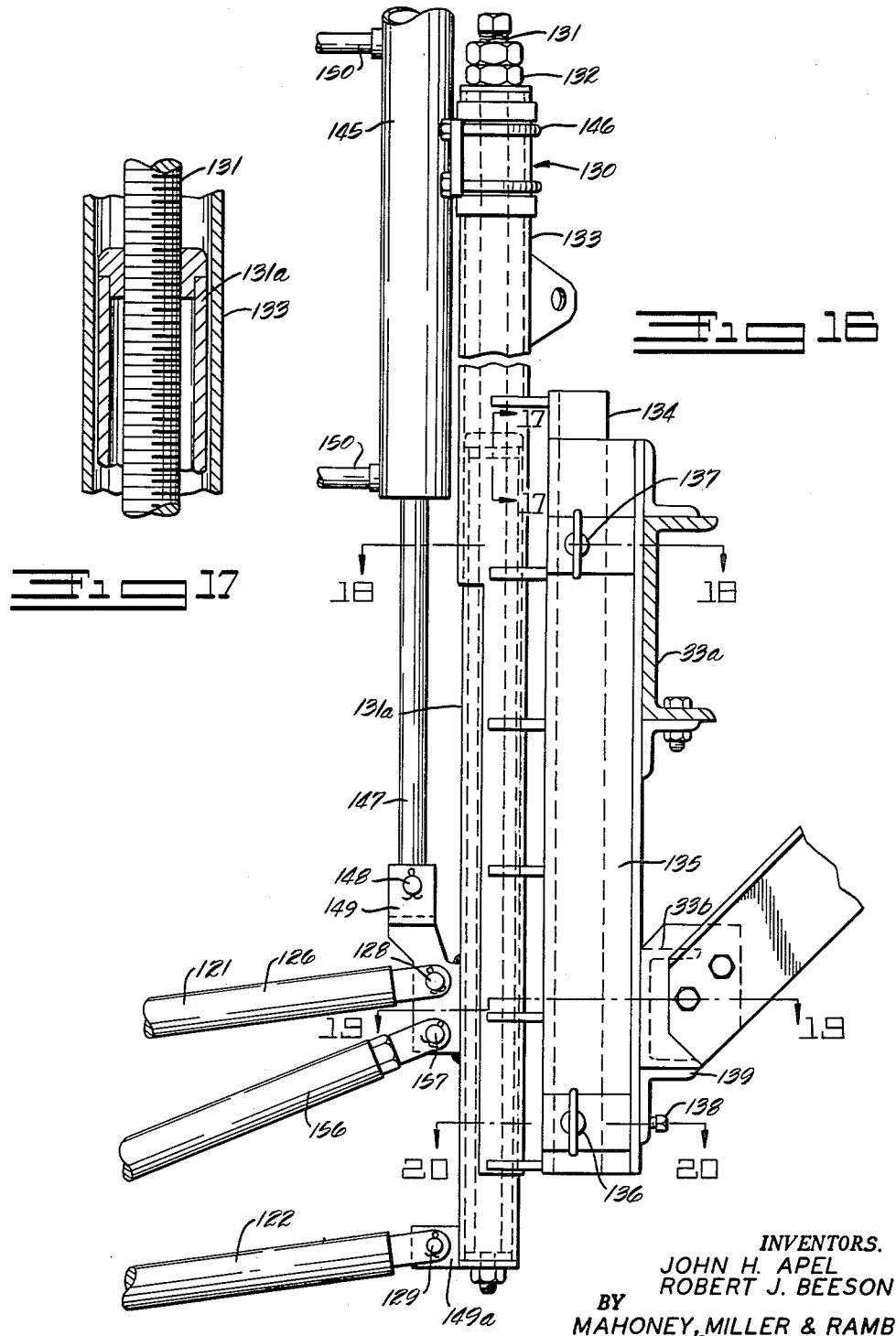

April 28, 1964 J. H. APEL ETAL 3,130,654
MATERIAL DISTRIBUTING AND LEVELING MACHINE
Filed Aug. 31, 1961 12 Sheets-Sheet 10
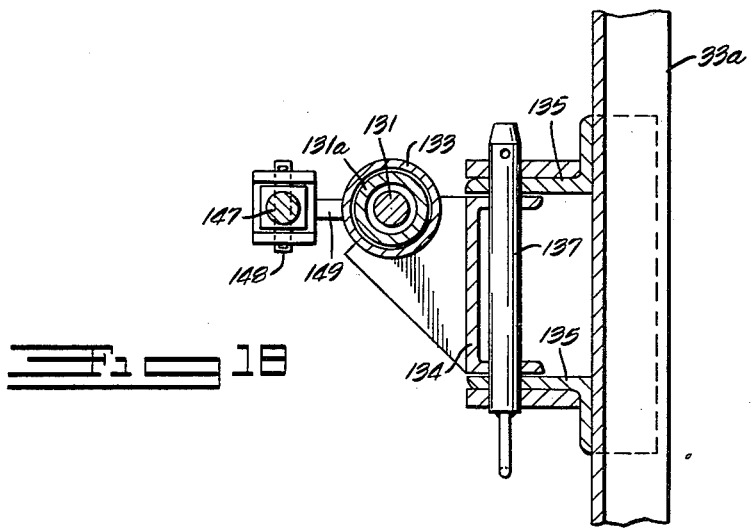
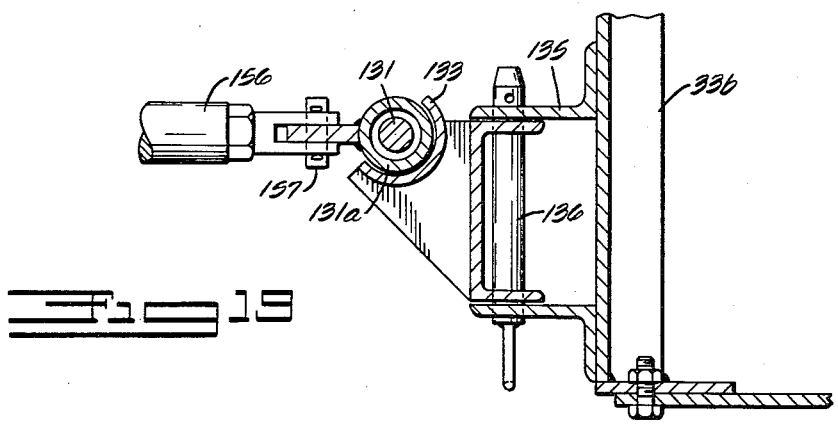
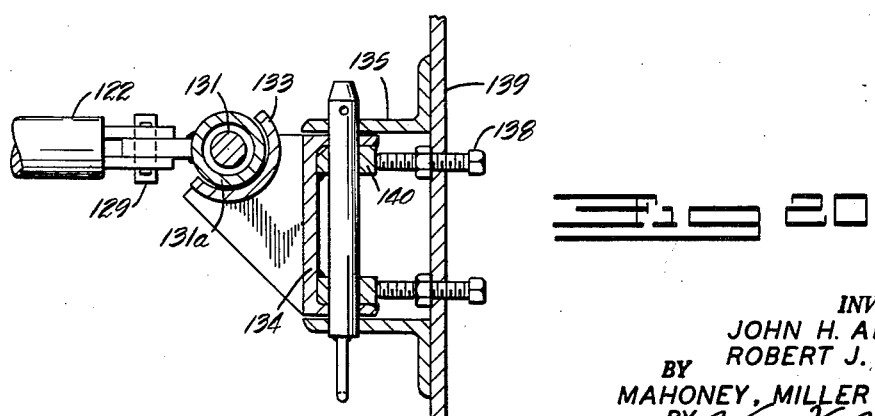
INVENTORS
JOHN H. APEL
ROBERT J. BEESON
BY MAHONEY, MILLER & RAMBO
ATTORNEYS.

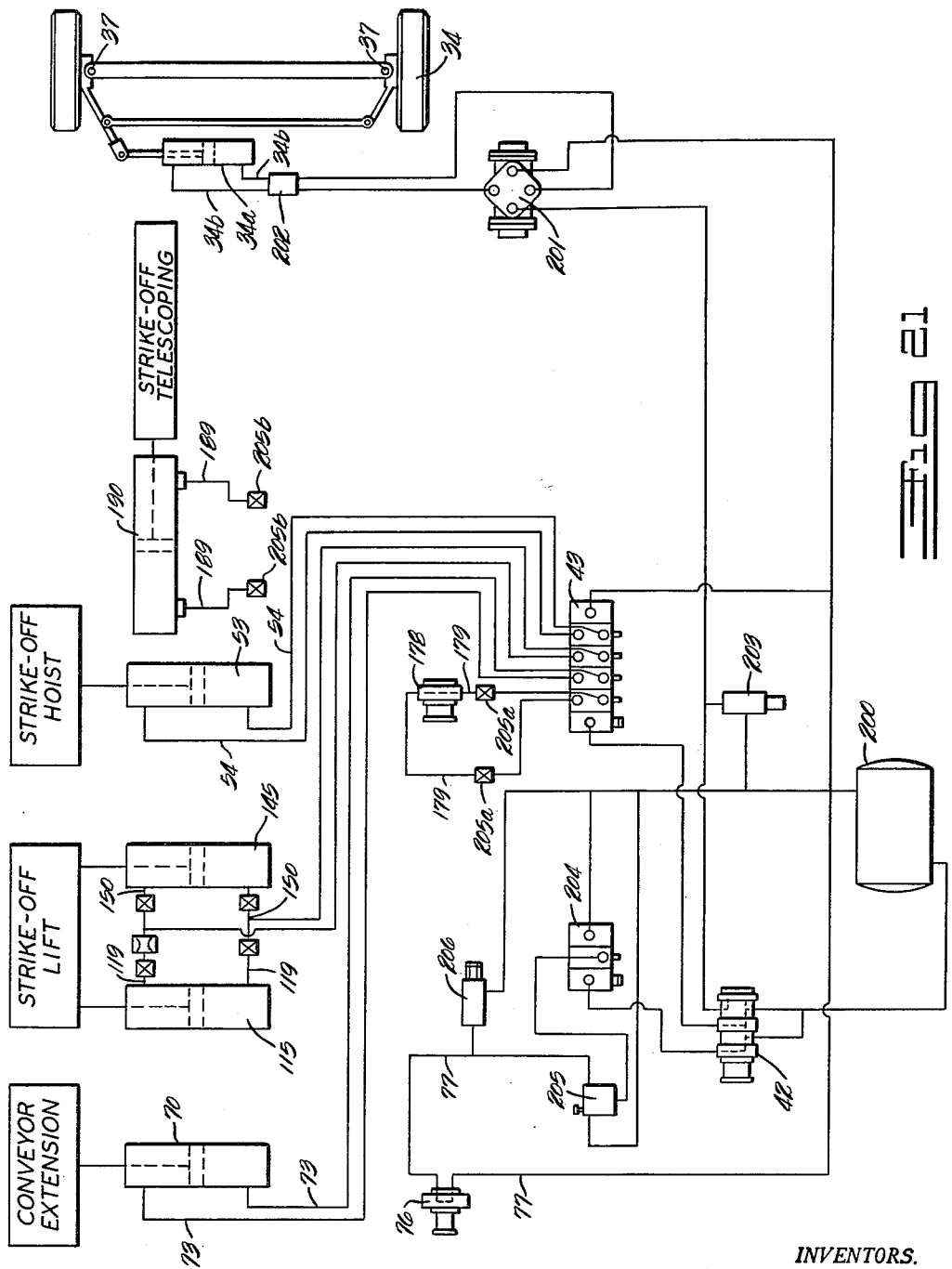

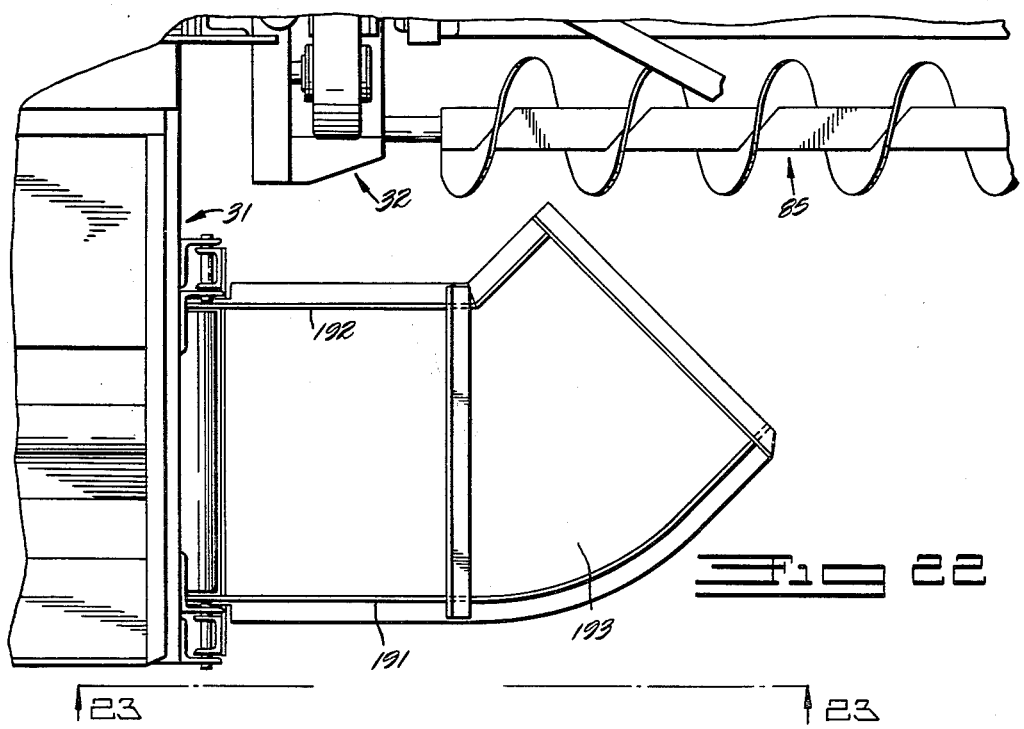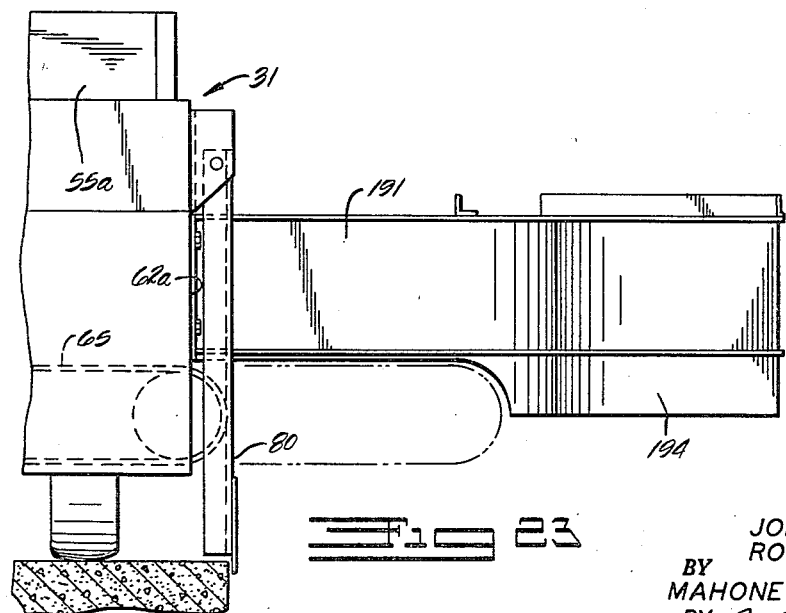

United States Patent Office 3,130,654
Patented Apr. 28, 1964

3,130,654
MATERIAL DISTRIBUTING AND
LEVELING MACHINE
John H. Apel, Columbus, and Robert J. Beeson, Worthington, Ohio, assignors to The Jaeger Machine Company, Columbus, Ohio, a corporation of Ohio
Filed Aug. 31, 1961, Ser. No. 135,267
11 Claims. (Cl. 94—46)

This invention relates to a material distributing and leveling machine. It has to do, more particularly, with a material distributing and leveling machine which is designed mainly for operation as a road widening machine to laterally extend an existing roadway by receiving, spreading and leveling paving material adjacent the existing roadway on a previously prepared surface. However, although the machine is designed mainly as a road-widening machine, and will be described as such hereinafter, it is to be understood that it is capable of other uses such as the laying of berm material along an existing road, back-filling of excavated material into ditches, distributing and leveling fill material in grading, and other material distributing and leveling operations.

Many road widening machines have been provided in the past. One of the great disadvantages of these prior art machines is that they have not been capable of handling all types of paving material on relatively wide surfaces and, therefore, they have not been capable of spreading various materials over prepared surfaces of the considerable width encountered in present-day widening jobs. Therefore, prior art machines have been made unduly complicated and expensive in an attempt to spread all various materials such as stone, concrete, black-top, etc. over considerable widths or have been made extremely simple, for handling one material only, for example, as stone spreaders which spread material by a bulldozing action. If the machine is designed similar to a common stone spreader, there is a dead load which must be pushed laterally over the surface to be covered a considerable distance out from the tractor of the machine which requires considerable power. Also, one type of simple prior art spreader has included a swinging mold board but here again there is a dead load which requires considerable force to push it across the surface to be covered. Another disadvantage of prior art machines is that adjustment necessary to produce different width strips has been difficult and time-consuming, and increasing the width of the machines has lessened the efficiency of their spreading action. Another difficulty, especially with the more complicated, cumbersome prior art machines, is that of transporting them from one job site to another due to their considerable overall width.

According to the present invention, there is provided a road widening machine which consists of a transport unit and a widener unit carried thereby. The transport unit is adapted to operate on the existing roadway and the widener unit is supported at one side thereof and extends laterally outwardly over a previously prepared strip along the adjacent edge of the existing roadway which strip is to be covered with suitable paving material. The transport unit is provided with a transversely extending material-receiving hopper at the front thereof into which the road material can be dumped from trucks moving along ahead of the transport unit on the existing roadway. The hopper is provided with a conveyor on which the material will fall from the truck and which will carry it transversely beyond the side of the transport unit and deposit it on the prepared strip in association with the widener unit.

The widener unit is supported on the transport unit for vertical adjustment by means of a special supporting and bracing structure which permits vertical adjustment relative to the transport unit and lateral extension and retraction in accordance with the width of the strip to be covered. The widener unit comprises mainly a distributing or spreading screw extending laterally outwardly from the transport unit, which engages the material deposited on the strip surface and spreads it outwardly over said surface, and a following cooperating strike-off structure which engages the leveled material and strikes it off to a predetermined level and crown. The widener unit also includes a side form or plate which shapes the outer edge of the additional strip of pavement being produced. The spreading screw and the strike-off are of telescoping structure to permit lateral adjustment of the side form in accordance with the width of the additional strip to be produced.

In the accompanying drawings, preferred embodiments of this invention are illustrated in the form of road-widening machines and in these drawings:

FIGURE 1 is a front elevational view of the machine showing it in position on an existing roadway to produce the strip along one of its edges.

FIGURE 2 is a plan view of the main portion of the machine.

FIGURE 3 is a side elevational view of the main portion of the machine.

FIGURE 4 is an enlarged transverse vertical sectional view taken through the feed conveyor of the machine substantially at the position indicated by line 4—4 of FIGURE 2.

FIGURE 5 is a horizontal sectional view taken substantially along line 5—5 of FIGURE 4.

FIGURE 6 is a diagrammatic view taken transversely through the feed conveyor of the widener unit substantially along line 6—6 of FIGURE 5.

FIGURE 7 is an enlarged horizontal sectional view taken along line 7—7 of FIGURE 1.

FIGURE 8 is an enlarged detail plan view of the strike-off blade structure of the widener unit shown in FIGURE 7.

FIGURE 9 is an enlarged transverse vertical sectional view through the screw spreader of the widener unit of the machine taken along line 9—9 of FIGURE 7.

FIGURE 10 is an enlarged transverse vertical sectional view through the screw conveyor of the widener unit of the machine taken substantially along line 10—10 of FIGURE 7.

FIGURE 11 is an enlarged transverse vertical sectional view through the strike-off plate of the widener unit of the machine taken substantially along line 11—11 of FIGURE 7.

FIGURE 12 is an enlarged transverse sectional view taken along line 12—12 of FIGURE 3 through one of the braces of the brace structure that is disposed between the transport unit and the widener unit of the machine.

FIGURE 13 is an enlarged transverse vertical sectional view taken along line 13—13 of FIGURE 2 showing the supporting and adjusting ram between the transport unit and the widener unit.

FIGURE 14 is a horizontal sectional view taken along line 14—14 of FIGURE 13.

FIGURE 15 is a horizontal sectional view taken along line 15—15 of FIGURE 13.

FIGURE 16 is an enlarged transverse vertical sectional view taken along line 16—16 of FIGURE 2 showing one end of the brace structure between the transport unit and the widener unit.

FIGURE 17 is a detail in enlarged vertical section taken along line 17—17 of FIGURE 16 through the adjusting screw of the supporting means at one end of the brace structure.

FIGURE 18 is a horizontal sectional view taken along line 18—18 of FIGURE 16.

FIGURE 19 is a horizontal sectional view taken along line 19—19 of FIGURE 16.

FIGURE 20 is a horizontal sectional view taken along line 20—20 of FIGURE 16.

FIGURE 21 is a diagram of the hydraulic system of the machine.

FIGURE 22 is a plan view illustrating a material deflector for cooperating with the feed conveyor and screw conveyor of the machine.

FIGURE 23 is a front elevational view taken along line 23—23 of FIGURE 22.

As previously indicated, the road widening machine of this invention comprises a transporting unit and a widener unit supported thereby. These units are illustrated in cooperative relationship in FIGURES 1, 2 and 3 of the drawings. The transport unit is illustrated generally by the numeral 31 and the widener unit generally by the numeral 32. The transport unit is adapted to operate on the existing roadway R, indicated in FIGURE 1, and the widener unit extends laterally therefrom and over a prepared surface S which extends along the edge E of the existing roadway and which is to be covered by the widener unit with a strip of road material that will abut the edge E of the existing roadway and will join and merge therewith so that it will be a smooth lateral extension of the existing roadway having a matching or required crown or will be at a different level whichever is desired.

The transport unit 31 may be of any suitable general structure embodying a suitably fabricated frame 33. This frame is carried by a pair of rear wheels 34 and a set of forward wheels 35 which may be of the pneumatically tired type so that they can operate over the surface of the existing roadway R without damaging such surface. Some of the wheels may be driven so that the machine is self-propelled and in the drawings these driven wheels are shown as being the front wheels 35 which are driven by chain drives 36. The rear wheels 34 are steerable by suitable means such as a hydraulic ram 34a, shown schematically in FIGURE 21, so that they can be moved about vertical axes 37 to steer the machine properly along the roadway R. The ram 34a is controlled by the hydraulic lines 34b. Projecting forwardly from the frame 33 at the side adjacent the strip S is an indicator arm and pointer 39 which can be sighted with the edge E by the operator to aid in steering the machine on course.

A separate drive 36 (FIGURES 1 and 2) is provided for the respective sets of wheels 35 and these drives include chain and sprocket reductions which are driven by an intermediate differential unit 38 supported on the frame 33. The differential 38 is driven by suitable transmissions 40 supported on the frame 33 which, in turn, are driven by an engine 41, such as an internal combustion engine, also supported on the frame. The engine 41, through a suitable power take-off, also drives a hydraulic pump 42 and this pump supplies hydraulic fluid to the various hydraulic units of the machine which will be referred to hereinafter. The pump 42 may be suitably connected to the control console 43 which will be adjacent the driver's seat 44. This control console will include the various control valves connected between the pump 42 and the various hydraulic units, the valves and their control connections being shown diagrammatically in FIGURE 21. A steering lever 45 for controlling steering by turning the wheels 34 may also be located adjacent the driver's seat 44.

The transport unit 31 is also preferably provided with hoist mechanism (FIGURES 1 and 3) which includes a cantilever horizontal arm or track 50 which is mounted for horizontal swinging movement about an upstanding column 51 carried by the frame 33. A hanger bracket or trolley 52 is mounted for movement along the track 50 and has suspended therefrom a hydraulic ram or hoist 53. This hoist 53 will receive hydraulic fluid from the pump 42 and will be controlled by a suitable valve at the console 43 through the hydraulic line connections 54 which will include flexible sections to permit swinging movement of the ram.

At the front end of the unit 31, as shown in FIGURES 1, 2 and 3, an upwardly opening hopper 55 is provided which extends completely across the front of the frame 33 and is supported thereby. At the forward side of this hopper rollers 56 are provided for engagement with a truck which will move ahead of the machine and will dump road-surfacing material in the hopper 55. As shown in FIGURES 2, 4 and 6, the forward and rearward walls 57 and 58 of the hopper, as well as the outer side wall 59, converge inwardly and downwardly to provide a throat 60 over a belt conveyor 65. The inner wall 62 of the hopper or wall at the side of the machine adjacent to the surface S (FIGURE 4), is vertical and is provided with an outlet mouth 63 just above the conveyor belt 65.

As shown best in FIGURES 4 and 5, the belt conveyor 65 comprises an endless belt which is carried by an idler pulley, drum or roll 64 and a driver roll 66 which are disposed at opposite sides of the frame 33 and which have their axes extending longitudinally of the unit 31 in parallel relationship. Transverse idler support rollers 67a are provided between the rolls 64 and 66 for supporting the upper run of the belt.

The drums or rolls 64 and 66 and the rollers 67a are carried between the transversely extending parallel channels 67 which face outwardly in opposite directions (FIG. 6). Each channel has its upper flange extending into and slidably disposed in a guide track 68 which is carried by the hopper 55 that is, in turn, supported by the frame 33 of the unit 31. The channels 67 are connected together as a unit by the axles 69 of the drums or rolls 64 and 66 and the rollers 67a and associated structure. Thus, there is provided an endless belt conveyor unit which is slidably adjustable transversely relative to the hopper outlet or discharge opening 63, as indicated by a comparison of the full-line and broken-line positions of FIGURE 4. This will properly position the discharge end of the conveyor relative to the widener unit 32 as will be apparent later.

For adjusting the conveyor unit transversely relative to the frame 33 of the unit 31, as shown in FIGURE 5, a hydraulic ram 70 is provided. This ram is disposed at the back of the hopper 55 and is connected between the movable conveyor unit and the fixed hopper and frame structure. Thus, the ram 70 has its piston rod connected by means including a bracket 71 to the associated channel 67 of the movable conveyor unit and has its cylinder connected at the opposite end of the ram by a clevis connection 72 to the fixed frame. Thus, controlling the ram 70 through the hydraulic line connections 73 will result in movement of the conveyor unit laterally in or out to any desired extent. It will be apparent from FIGURE 4 that the conveyor is substantially longer than the hopper 55 to permit this adjustment of the conveyor laterally of the hopper 55 and still have the conveyor belt disposed under the entire area of the throat 60.

The belt conveyor 65 is driven by driving the drum 66 as previously indicated. Driving of the drum is accomplished, as shown in FIGURES 5 and 6, by means of a chain drive 75 from a hydraulic motor 76 through a speed reducer 74. This motor 76 and speed reducer 74 are fixed to one of the channels 67 (FIGURE 4) and the reducer is disposed with its axis parallel to the axis of the drum 66 and spaced therefrom. The motor 76 is controlled by hydraulic lines 77 which must include flexible sections to permit movement of the motor with the belt conveyor unit which carries it.

As shown in FIGURES 1, 3, 4, and 5, beneath the discharge end of the belt conveyor 65, an edging skirt or deflector plate 80 is provided on the unit 31. This deflector plate is normally vertically disposed and extends longitudinally of the unit 31 closely adjacent or in contact with the edge E and, as later discussed, will limit inward feeding of material from the widener unit 32 over onto the surface of the existing roadway R or the forming of a ridge therealong as will later appear. The plate 80 is fixed to the lower ends of a pair of suspending arms 81 which are pivoted at their upper ends to the frame 33 by pivot pins 82. The normal position of the plate 80 is illustrated in full lines in FIGURE 4 but it can be swung upwardly into an inoperative position, as indicated in broken lines, and held in such position by any suitable means. However, to be swung upwardly, the conveyor 65 must be retracted to the full line position shown in FIGURE 4.

Thus, it will be apparent that the transport unit 31 can be self-propelled along the existing roadway R upon which it will operate and a truck can move along therewith in front of such unit and dump material into the hopper 55. The belt conveyor 65 will move the material laterally and deposit it on the surface S in front of the widener unit 32. The conveyor 65 may be moved laterally by controlling the hydraulic ram 70 to adjust the discharge end of the conveyor relative to the surface S. This adjustment will be desirable to vary the conveyor discharge point in accordance with the width of the surface S and in accordance with the type of material being used to cover the surface S.

The widener unit 32 is suspended from the side of the unit 31 by a cantilever type support. The manner in which the unit 32 is suspended from the unit 31 is illustrated generally in FIGURES 1, 2 and 3. The unit 32 comprises mainly a screw conveyor 85 which extends transversely of the unit 32 and is exposed at its forward side, a strike-off blade structure 86 which is disposed directly behind the screw 85 and extends parallel to the axis thereof, and a side form or edging plate 84 which is in upright position at the outboard end of the screw 85 which preferably normally extends at right angles to the axis of the screw and parallel to the adjacent side of the unit 31. The screw 85 and strike-off blade 86 are of telescoping structure to permit variation of the distance of the side form plate 84 from the adjacent side of the unit 31, as indicated by broken lines in FIGURE 2, in order to vary the width of the strip produced over the surface S. The unit 32 is adapted to be moved through the material deposited on the surface S by the conveyor 65, the screw 85 is adapted to spread it across the surface S and roughly level it, and the strike-off 86 is adapted to follow the screw and strike-off and level the spread material to the desired level and crown.

The inner end of the widener unit 32 is supported from the side of the unit 31 for bodily vertical adjustment, for swinging movement forwardly or rearwardly in a horizontal plane about a vertical axis, and for tilting movement about vertically spaced horizontal axes. The supporting structure which makes all of these adjustments possible is illustrated best in FIGURES 7, 13, 14, and 15.

As shown best in FIGURES 3 and 7, the screw 85 and the strike-off 86 are disposed in tandem relationship, and the spacing or gaps between these members is adjustable so that the gap can be varied when working with various materials. The inboard ends of the screw 85 and strike-off 86 are relatively adjustably carried by a platform support or sub-frame assembly 87 whereas their outer ends are relatively adjustably carried by the side form plate 84. The assembly 87 includes a rearwardly extending upright plate 88 which is connected to the frame 33 by a guide sleeve and rod unit 90, as shown in FIGURES 14 and 15. This unit 90 includes a guide sleeve 91 which is rigidly secured, as by welding, to an upright support channel 92. The sleeve 91 is cut away to semicircular form at its lower end, as indicated in FIGURE 15, to permit vertical movement of an upright lateral connecting plate 88a which connects the plate 88 to a guided sleeve 93 that slides vertically in the guide sleeve 91. A rod 94 has its lower end rotatably anchored at 94a (FIGURE 13) to the lower end of the sleeve 93 and extends upwardly through this sleeve and on its threaded projecting upper end carries a plurality of stop and lock nuts 94b. These nuts 94b engage with a cap 94c on the upper end of the sleeve, through which the rod loosely passes, and, therefore, limit the lowermost position of the sleeve 93 in the sleeve 91, it being apparent that this position can be adjusted by rotation of the nuts 94b on the rod 94. The rod 94 slides through a cap 93a on the upper end of the sleeve 93. The upward position of the rod 94 will be determined by the stroke of the hydraulic ram 115 hereinafter described.

The channel 92 is carried by a special mounting and hinge structure on the frame 33 at its outboard side in such a manner not only to permit pivoting relative to the frame 33 but also complete removal therefrom if desired. This structure is illustrated best in FIGURES 13, 14 and 15. The channel 92 is inserted between the upright angles 95a which are attached at their lower ends (FIGURE 15), as by welding, between the bracket members 95b of Z-cross section. These members 95b are disposed on opposite sides of yokes 95c which are rigidly carried by and extend inwardly from a plate 95d at its lower end. This plate 95d is suitably attached as by angle members 95e to the outer surfaces of the upper horizontal beam 33a of the frame 33. The yokes 95c are attached by the bolts 95f to the lower horizontal beam 33b of the frame 33. The movable bracket members 95b are pivoted by the pivot bolts 95 to the stationary yoke members 95c. Thus, the channel 92 is swingable with the associated supports 95a and 95b about the pivot bolts 95. A lock pin 96 removably holds the lower end of the channel 92 within its support members, the pin passing through aligning openings in the members 95a and 95b and this pin is removable by means of an attached handle 96a being normally kept in position by a cotter key 96b. Adjusting screws 99 are carried by the members 95a and extend through access openings in the associated plate 95d. These pins 99 engage the flanges of the channel 92, which may be doubled as shown, to accurately position the channel relative to the members 95a and the pin-receiving openings formed in the members 95a and 95b.

The upper end of the channel 92 (FIGURE 14) is positioned between the upright members 95a. These members are positioned adjacent brackets 100 and their upper ends are movable about the lower pivot pins 95 relative to these brackets. The brackets 100 are welded or otherwise rigidly secured to the frame member 33a and movement of the members 93 relative to the brackets is limited by stop angles 101 which are welded to the upper ends of the upright angles 95a. The angles 101 are adjustably secured to the brackets 100 by means of clamp bolts 102 which are positioned in arcuate slots 103 in the brackets 100. Thus, the upper ends of the members 95a can be adjusted relative to the brackets 100 and clamped in adjusted position by the bolts 102.

For adjusting the members 95a about the axes of the lower pivot bolts 95, an adjusting screw 105 is provided. This screw is threaded through a transverse pin 106 pivotally carried by the upper ends of the members 95a and through a similar pin 107 pivotally carried by the spaced brackets 97 carried by the beam 33a. Rotation of this adjusting screw 105 will swing the members 95a about the axes of the lower pivot bolts 95 and at this time the clamp bolts 102 will be released. This adjustment is indicated by broken lines in FIGURE 13. This adjustment will raise or lower the outboard end of the unit 32 so that the strip laid on the surface S will be at proper crown relative to that of the existing roadway.

The upper end of the channel 92 is hinged to the supports 95a by means of an upper hinge pin 108 which is normally retained in position by a cotter key 110 and is removable by a handle 111. Thus, if the lower lock pin 96 is removed, the channel 92 may be swung around the upper pin 108. This makes it possible to swing the outboard end of the unit 32 upwardly to clear small obstructions. In this operation, the hoist 53 will be used as indicated by broken lines in FIGURE 1. If complete removal of the unit 32 is desired, both pins 96 and 108 are removed and the entire unit may be lifted by the hoist, and be positioned on a truck or other vehicle for transport to a different location.

The unit 32 is also vertically adjustable relative to the unit 31 so as to vary the thickness of the strip produced by the unit 32. For this purpose, a hydraulic ram 115 is provided and is shown best in FIGURES 1 to 3, 7, 13, 14, and 15. The cylinder of this ram is clamped to the guide sleeve 91 by means of a clamping ring arrangement 116 (FIGURES 7 and 13) around the upper end of the support and guide sleeve 91. The downwardly extending piston rod 117 of this ram is pivoted at its lower end at 118 to the upper edge of the support plate 88. The ram is controlled through suitable hydraulic lines 119 which are connected to the pump 42 through suitable valves at the control console 43. Of course, these lines will include flexible sections and disconnect couplings to permit necessary adjustments of the unit 32 or complete removal thereof relative to the unit 31. Thus, by controlling the ram 115, the plate 88, the assembly 87, and the units supported thereby can be adjusted vertically relative to the frame 33. Upward adjustment will cause the guided sleeve 93 to move relative to the guide sleeve 91 and the lowermost position of the sleeve 93 will be determined by contact of the nuts 94b with the cap 94c.

It will be apparent that the assembly 87 is so mounted that it will swing about the axis of the rod 94 unless restrained. In order to restrain this movement and to keep the screw 85 and strike off 86 carried by the support or assembly 87 substantially at right angles to the frame 33, a special brace arrangement is provided. This brace arrangement is illustrated generally in FIGURES 2 and 3 and specifically in FIGURES 12 and 16 to 20. This brace structure is in the form of a parallelogram brace comprising upper and lower braces 121 and 122 (FIGURE 3), each composed of telescoping sections. The forward and outer ends of these braces are pivoted at 123 and 124 to the strike-off blade structure 86, these pivots being laterally outboard of the frame 33, as shown best in FIGURE 2. Each brace is composed of an outer section 125 (FIGURES 2 and 3) which telescopes into an inner section 126. A clamp 127 is provided on the outer end of the section 126 for releasably clamping it to the section 125. The inner ends of the sections 126 of the respective braces 121 and 122 are pivoted at the respective pivots 128 and 129 (FIGURE 16) to the lower end of a guide sleeve and rod structure 130 which is similar to that previously described for supporting the member 87 and associated parts but does not include the equivalent of the crown screw 105. This guide structure includes the rod 131 which is provided on its threaded upper end with the stop nuts 132.

The rod 131 carries for axial adjustment a guided sleeve 131a which slides in a guide sleeve 133 that is of semicircular form at its lower end to permit outward projection of the brackets 149 and 149a which carry the brace pivot pins 128 and 129, respectively.

The sleeve 133 is carried by a vertically disposed channel 134 which is like the channel 92 previously described. This channel 134 is disposed between the upright supports 135 (FIGURES 18 to 20) which are welded or otherwise secured in upright spaced relationship to the beams 33a and 33b of the frame 33. The channel 134 is removably hinged to the frame 33 similar to the channel 92 and the upper hinge pin 137 thereof is along the same axis as the hinge pin 108. The lower end of the channel 134 is locked to the upright supports 135 by a removable lock pin 136. The upper end of the channel 134 is hinged to the members 135 by an upper removable hinge pin 137. At the lower end of the channel 134 (FIGURE 20) locating screws 138 are threaded through an angle bracket 139 secured to the stationary members 135 and engage blocks 140 carried by the channel 134. These screws 138 will accurately locate the openings in the channel 134 and the members 135 for receiving the lock pin 136.

A ram 145 of the hydraulic type (FIGURE 16) is clamped to the support sleeve 133 by means of a clamping ring or collar arrangement 146. The lower end of the piston rod 147 of this ram is pivoted at 148 to the bracket structure 149. This ram will be controlled from the console 43 by means of the lines 150 connected thereto which will include flexible sections and disconnect couplings. The ram 145 can be controlled simultaneously with the ram 115 so that vertical movement at the inner end of the brace structure will correspond with the vertical movement of the support or assembly 87 which carries the strike-off blade 86 and the screw 85. Furthermore, as in the other guide structure described, both upward and downward movement of the rod 131 is freely permitted within a limited extent. Pivoting of the brace-supporting channel 134 about the upper hinge pin 137 is permitted upon removal of the lock pin 136 and complete disconnection of the channel 134 is permitted by complete removal of both pins 136 and 137. This permits disconnection of the brace structure when the support 87 is disconnected from the frame 33 in order to permit complete removal of the widener unit 32. Hinging of the brace-supporting channel 134 is thus practically the same as that of the channel 92, which supports the strike-off and screw conveyor, except for the crown adjustment of channel 92 with the screw 105, and therefore the entire unit 32 can be swung upwardly or downwardly about the respective upper hinge joints when desired or the unit can be completely removed and replaced as desired.

The brace structure also includes cross links 155 (FIGURE 3) pivotally connected to the outer ends of the brace sections 126. Also, a diagonal turnbuckle brace 156 is provided, the inner section of which is pivoted at 157 to the bracket 149 (FIGURE 16). The outer end is pivoted at 158 (FIGURE 3) to the outer end of the section 126 of the lower brace 122.

The inner end of the brace structure can be suspended by the ram 145 at such a height relative to the suspension of strike-off 86 by the ram 115 that the braces 121 and 122 will extend downwardly as well as laterally outwardly, as indicated in FIGURES 2 and 3. This parallogram brace structure will therefore brace the strike-off blade 86 and associated screw 85 so that the rearward thrust by the material being operated upon will be resisted and they will remain in outwardly extending relationship to the frame 33 substantially at right angles thereto. Also the brace structure will exert a downward thrust on the strike-off 86 resisting the upward thrust of the material being operated upon and will prevent twisting of the strike-off. At this time, it will be understood that the clamps 127 will be tight and the turnbuckle 156 will be properly extended. The turnbuckle 156 will serve to make the parallelogram linkage rigid. Since the braces 121 and 122 telescope and the turnbuckle 156 is adjustable, they can be relatively adjusted to obtain the proper incline on the braces. Also, when the crown of the strike-off is adjusted by means of the screw 105, the braces can be adjusted.

As previously mentioned and as indicated in FIGURES 7 and 8, the screw conveyor 85 and the strike-off blade 86 are of telescoping structure. The structure of the screw is illustrated in FIGURES 7, 9 and 10. The screw includes a driven outboard shaft portion 165 (FIGURES 9 and 10) of annular cross section which is slidably mounted in a bearing block 166. The block 166 is bolted by the bolts 167 to the surrounding sleeve 168 which like the block is of square outline. The block may also be provided with a bushing 169. The square sleeve 168 has the helical blades 170 mounted on the exterior thereof. The shaft 165 carries and is keyed to a square block 171 (FIGURE 10) which slidably fits in the inboard drive sleeve 168. The outer end of the driven shaft 165 (FIG- URE 7) is carried by a rotatable member 172 which is mounted in a bearing 173 in the main section of the side or form plate 84. The bearing 173 is disposed in a vertical slot 173a (FIGURE 3) formed in the upstanding plate 84a of the side form which is provided with a runner portion 84b at its lower edge. The slot 173a permits vertical adjustment of the side form relative to the screw so it will contact the surface even if the level of the strike-off and screw are adjusted relatively. For this adjustment, the bearing 173 may be bolted to the side form plate 84a by the bolts 173b which will be positioned in different sets of openings 173c. To adjust the total length of the screw, the shaft 165 will be telescoped in and out through the block 166. If the telescoping screw is extended considerably, additional blade sections 170a (FIGURE 7) may be added at the outer end of the shaft 165 but this arrangement may be reversed. These sections may be clamped to the exposed outer end of the shaft by the clamping collars 174.

The inner end of the sleeve 168 is rotatably carried by a bearing structure 175 which is supported on the support member or assembly 87. The shaft is driven by a chain and sprocket drive 176 from a gear box 177 which, in turn, is driven by a reversible hydraulic motor 178. Both the gear box 177 and the motor 178 are carried by the support 87 and associated structure. The motor 178 will be controlled from the console 43 through the connecting hydraulic lines 179 (FIGURE 21) which will include flexible sections and disconnect couplings.

The telescoping strike-off blade as shown in FIGURES 7, 8 and 11, comprises an inner section 185 which has its inner end supported by the support 87. The inboard end of the strike-off section 185 is provided with an upstanding plate 86a (FIGURE 7) which extends forwardly and rearwardly and flatly contacts the plate 88 of the assembly 87. This plate 86a is welded to the inner end of the strike-off section and is adjustable forwardly and rearwardly along the support plate 88 by means of the bolts 86b cooperating with different sets of openings 88b in the plate 88. The brace structure previously described is connected to the outer end of the section 185 at the pivots 123 and 124, previously referred to. Telescoping within the outer end of the section 185 is the inner end of the outer section 186. The outer end of this section 186 is rigidly secured to the plate section 84c of the side form plate 84 at right angles thereto. This plate section 84c is an upright flat section in flat contact with the associated plate section 84a and both extend longitudinally and are relatively adjustable longitudinally. For this purpose, the section 84c is bolted to the section 84a by the bolts 84d which may be selectively positioned in different sets of openings 84e. Thus, since the strike-off support plates 86a and 84c are adjustable longitudinally, the gap between the strike-off 86 and the screw 85 can be varied. The strike-off section 186 may be clamped in adjusted position relative to the section 185 by means of a pair of clamping screws 187 (FIGURE 11) carried by the section 185. Thus, the screw and strike-off plate can be extended or retracted simultaneously by a pull or push on the side plate 84 when the bolts 187 are released. This extension or retraction is preferably accomplished with a hydraulic ram 190 which has its cylinder portion carried by the inboard section 185 and which has its piston rod pivoted at 190a to the outboard section 186. The ram is controlled by hydraulic lines 189 which will include flexible sections and disconnect couplings. The strike-off assembly will be held in the adjusted position by tightening the bolts 187. An additional section or sections 186a (FIGURE 8) for the strike-off may be bolted to the inner end of the outer section 186 by the bolts 188 if the adjustment of the side form 84 outwardly is to such an extent as to require it.

In order to direct the material from the belt conveyor 65 more closely into association with the screw 85, the arrangement shown in FIGURES 22 and 23 may be provided. In this case a front baffle plate 191 and a rear baffle plate 192 are mounted on the end wall 62a of the hopper 55a. These baffles extend in parallel relationship outwardly and then rearwardly toward the screw 85. They form a chute or material deflecting passageway 193 over the belt of the conveyor 65, when it is extended, so as to direct the material off the conveyor and rearwardly more directly into association with the screw 85. The rearwardly directed portions of the baffles 191 and 192 depend below the upper run of the conveyor as indicated at 194 in FIGURE 23 so as to more effectively direct the material rearwardly. When the plates 191 and 192 are used it will still be possible to swing the deflector plate 80 upwardly until it engages therewith assuming the conveyor 65 is retracted.

The hydraulic circuit is illustrated schematically in FIGURE 21 and includes the various hydraulic units previously mentioned. The hydraulic pump is of the multiple unit type and has a suction line connected to the tank 200. One unit of the pump 42 supplies pressure for the rotary valve 201 that controls the steering cylinder 34a through a double check valve 202. The steering portion of the system includes a relief valve 203. Another unit of the pump 42 controls the conveyor drive motor 76 and this portion of the circuit includes the three-way valve 204, the flow control valve 205, and the relief valve 206. Ordinarily, the motor 178 is connected in the system by the lines 179 at the disconnect couplings 205a but when it is desired to extend the screw 85 and strike-off 86, the lines 179 are disconnected at these couplings and the coupling portions 205b on the lines 189 are connected. This will permit functioning of the ram 190 in the system to extend or retract the strike-off and screw.

It will be apparent that in operation of the machine, the proper adjustments of the unit 31 for width of the strip to be laid on the surface S are made by moving the side form 84 in and out by means of the ram 190 to extend or retract the screw 85 and strike-off or screed 86, and the form may be locked in the selected position. Also, the form is properly adjusted vertically relative to the screw and strike-off to produce the surface at the desired level relative to the surface of the existing roadway R. These surfaces may be at the same or different levels. The level of the strike-off and screw will be selected by operation of the rams 115 and 145. The gap between the screw and strike-off will be adjusted in accordance with the material being spread and leveled. The unit will be adjusted about the lower pivot bolts 95 to obtain the desired inclination or crown on the strike-off 86 and at the same time the base structure must be adjusted to permit this. The parallelogram brace structure will be adjusted to properly brace the strike-off to prevent twisting, forward and rearward, and up and down movement of the strike-off. As the unit 31 is propelled along the surface of the roadway R, material will be supplied to the hopper 55. This material will be discharged by the conveyor 65 onto the surface S in front of the screw 85 and more directly into association therewith if the chute or deflector 193 is used. The material will be engaged by the screw 85 as it advances therethrough and will be spread laterally across the surface. The screw may be reversed from time to time to aid in the distribution of the material. The deflector plate 80 will cooperate with the edge E to limit spreading of the material at the inner end of the screw, preventing it from spilling over onto the surface of the roadway R or the formation of a ridge at the edge E if the strike-off is below the surface thereof. The strike-off 86 follows the screw 85 and will level off the material spread by the screw to the desired level and crown. Thus, a strip will be produced over the surface S which will merge with the roadway R at the edge E, or which will be at different levels relative thereto. The indicator 39 will be sighted with the edge E by the operator to keep the machine on a straight course. If an obstruction is encountered which can't be avoided, the unit 32 will be swung upwardly to clear it about the upper hinge pins 108 and 137. For transporting, the unit 32 can be completely removed to reduce considerably the overall width of the machine. The pivotal adjustment of the unit 32 or its removal will be facilitated by use of the hoist 53.

It will be apparent from the above description that this invention provides for a road widening machine which is of relatively simple structure but which will still handle all types of material and effectively spread them across the surface to be covered and level them to form a smooth surface at a desired level relative to the existing roadway. Various adjustments are provided on the machine to make it function properly and these adjustments may be readily made. These adjustments include the adjustment for width of the strip to be produced, the crown or transverse inclination to be produced thereon, the vertical position of the strike-off and screw to determine the thickness and level of pavement and the adjustment of the parallelogram brace structure to hold the strike-off member in proper position. Also the widening unit, although normally suspended from the side of the transport unit by a rigid structure, can be easily removed for positioning on the transport unit or on a truck for transportation to a new job. Since hydraulic means is provided for operating the various units, the machine can be easily operated by a single operator.

Various other advantages will be apparent.

Having thus described this invention, what is claimed is:

1. A machine of the type described comprising a transport unit carried by traction means adapted to operate on an existing surface, a spreader unit supported at one side of the transport unit and extending laterally outboard therefrom so as to produce a strip of road material on a prepared surface along the adjacent edge of the existing surface, said spreader unit comprising a screw spreader for engaging material deposited on said prepared surface and spreading it laterally thereof, said screw spreader comprising telescoping sections adjustable relatively to vary the length of said screw spreader to produce strips of varying widths, said transport unit including a transversely extending conveyor at its forward end for receiving material and carrying it laterally to one side of the transport unit where it is deposited on said surface in front of said screw spreader, said conveyor being mounted on said transport unit for lateral extension and retraction relative to the outboard side thereof to vary the position of deposit of the material relative to said screw spreader.

2. A machine according to claim 1 in which said conveyor is a belt-type conveyor which is disposed at the bottom of a hopper mounted at the front of said transport unit, said hopper having an outlet mouth at the outboard side of the spreader unit, and a deflector chute extending laterally from said mouth over said belt conveyor and turned rearwardly toward said screw spreader for depositing material directly into association therewith.

3. A machine of the type described comprising a transport unit mounted on traction means which are steerable and which are adapted to operate over an existing surface adjacent an edge thereof, a leveling unit carried by the transport unit and extending laterally from the outboard side thereof adjacent the said edge of said existing surface and outwardly therefrom and adapted to extend over a prepared surface on which a strip of material of predetermined width is to be formed by said leveling unit, a cantilever support arrangement for supporting said leveling unit and including a forward support mounted for vertical guided movement on said transport unit, a strike-off member composed of telescoping sections, the innermost of said sections being connected to said forward support, a side form plate having the outermost of the strike-off sections connected thereto, a rear support mounted on said transport unit behind said forward support for vertical movement, a brace extending rearwardly and inwardly from the outer portion of said innermost strike-off section to said rear support, a telescoping screw spreader in front of said strike-off, said screw spreader being formed of telescoping sections and having the inner end of its innermost section connected to said forward support and the outer end of its outermost section connected to said side form plate, said screw spreader and strike-off being disposed on different sections of the forward support and the side form plate which are relatively adjustable to vary the gap therebetween.

4. A machine of the type described comprising a transport unit mounted on traction means which are steerable and which are adapted to operate over an existing surface adjacent an edge thereof, a leveling unit carried by the transport unit and extending laterally from the outboard side thereof adjacent the said edge of said existing surface and outwardly therefrom and adapted to extend over a prepared surface on which a strip of material of predetermined width is to be formed by said leveling unit, a cantilever support arrangement for supporting said leveling unit and including a forward support mounted for vertical guided movement on said transport unit, a strike-off member composed of telescoping sections, the innermost of said sections being connected to said forward support, a side form plate having the outermost of the strike-off sections connected thereto, a rear support mounted on said transport unit behind said forward support for vertical movement, a brace extending rearwardly and inwardly from the outer portion of said innermost strike-off section to said rear support, a telescoping screw spreader in front of said strike-off, said screw spreader being formed by telescoping sections and having the inner end of its innermost section connected to said forward support and the outer end of its outermost section connected to said side form plate, and a hydraulic motor carried by said forward support for driving said screw spreader.

5. A machine of the type described comprising a transport unit mounted on traction means which are steerable and which are adapted to operate over an existing surface adjacent an edge thereof, a leveling unit carried by the transport unit and extending laterally from the outboard side thereof adjacent the said edge of said existing surface and outwardly therefrom and adapted to extend over a prepared surface on which a strip of material of predetermined width is to be formed by said leveling unit, a cantilever support arrangement for supporting said leveling unit and including a forward support mounted for vertical guided movement on said transport unit, a strike-off member composed of telescoping sections, the innermost of said sections being connected to said forward support, a side form plate having the outermost of the strike-off sections connected thereto, a rear support mounted on said transport unit behind said forward support for vertical movement, a brace extending rearwardly and inwardly from the outer portion of said innermost strike-off section to said rear support, said forward support having vertically spaced hinge axes.

6. A machine according to claim 5 in which the forward and rear support are connected to the transport unit by removable means.

7. A machine according to claim 5 in which said brace is of parallelogram construction comprising horizontal rods of telescoping form, and a turnbuckle rod connected to said horizontal rods.

8. A machine of the type described comprising a transport unit mounted on traction means which are steerable and which are adapted to operate over an existing surface adjacent an edge thereof, a leveling unit carried by the transport unit and extending laterally from the outboard side thereof adjacent the said edge of said existing surface and outwardly therefrom and adapted to extend over a prepared surface on which a strip of material of predetermined width is to be formed by said leveling unit, a cantilever support arrangement for supporting said leveling unit and including a forward support mounted for vertical guided movement on said transport unit, a strike-off member composed of telescoping sections, the innermost of said sections being connected to said forward support, a side form plate having the outermost of the strike-off sections connected thereto, a rear support mounted on said transport unit behind said forward support for vertical movement, a brace extending rearwardly and inwardly from the outer portion of said innermost strike-off section to said rear support, said transport unit including a conveyor across the front thereof for receiving material and depositing it in front of said leveling unit, said conveyor being of the endless belt type, said conveyor being mounted for movement laterally of the transport unit, and a hydraulic ram connected between the conveyor and the transport unit for adjusting it laterally.

9. A machine according to claim 8 including a deflector chute carried by said transport unit and disposed over the belt conveyor adjacent the discharge end thereof for directing the conveyed material rearwardly toward the leveling unit as it is discharged from said conveyor.

10. A machine of the type described comprising a transport unit carried by traction means adapted to operate on an existing surface, a leveling unit supported at one side of the transport unit and extending laterally outboard therefrom so as to produce a strip of road material on a prepared surface along the adjacent edge of the existing surface, said leveling unit including a strike-off member for engaging material deposited on said prepared surface, said strike-off member comprising telescoping sections adjustable relatively to vary the length of said strike-off member to produce strips of varying widths, said transport unit including a transversely extending conveyor at its forward end for receiving material and carrying it laterally to one side of the transport unit where it is deposited on said surface in front of said strike-off member, said conveyor being mounted on said transport unit for lateral extension and retraction relative to the outboard side thereof to vary the position of deposit of the material relative to said strike-off member.

11. A machine according to claim 10 in which said conveyor is a belt-type conveyor which is disposed at the bottom of a hopper mounted at the front of said transport unit, said hopper having an outlet mouth at the outboard side of the spreader unit, and a deflector chute extending laterally from said mouth over said belt conveyor and turned rearwardly toward said strike-off member for directing material toward said member.

References Cited in the file of this patent

UNITED STATES PATENTS

| | | |
|---|---|---|
| 1,569,531 | Barry | Jan. 12, 1926 |
| 1,910,120 | Mowbray | May 23, 1933 |
| 1,993,656 | Gardiner | Mar. 5, 1935 |
| 2,011,777 | Ritchie | Aug. 20, 1935 |
| 2,101,666 | Austin | Dec. 7, 1937 |
| 2,491,797 | Burns | Dec. 20, 1949 |
| 2,848,930 | Thompson | Aug. 26, 1958 |
| 2,906,041 | Shipley | Sept. 29, 1959 |
| 2,965,986 | Kershaw | Dec. 27, 1960 |
| 3,015,258 | Apel et al. | Jan. 2, 1962 |
| 3,015,261 | MacDonald | Jan. 2, 1962 |
| 3,031,938 | Bero | Mar. 1, 1962 |